United States Patent [19]
Förnsel

[11] Patent Number: 5,837,958
[45] Date of Patent: Nov. 17, 1998

[54] METHODS AND APPARATUS FOR TREATING THE SURFACE OF A WORKPIECE BY PLASMA DISCHARGE

[75] Inventor: Peter Förnsel, Spenge, Germany

[73] Assignee: Agrodyn Hochspannungstechnik GmbH, Steinhagen, Germany

[21] Appl. No.: 707,075

[22] Filed: Sep. 3, 1996

[30] Foreign Application Priority Data

Sep. 1, 1995 [DE] Germany .................. 195 32 412.9

[51] Int. Cl.⁶ .................................................. B23K 10/00
[52] U.S. Cl. .............................. 219/121.5; 219/121.51; 219/121.4; 313/231.51
[58] Field of Search ............................. 219/121.5, 121.51, 219/121.52, 121.48, 121.59, 121.36; 313/231.31, 231.41, 231.57

[56] References Cited

U.S. PATENT DOCUMENTS

| | | |
|---|---|---|
| 2,892,067 | 5/1959 | Donald et al. . |
| 2,944,140 | 7/1960 | Giannini et al. . |
| 3,515,839 | 6/1970 | Gejo et al. . |
| 3,579,027 | 5/1971 | Pater . |
| 3,803,380 | 4/1974 | Ragaller . |
| 3,849,584 | 11/1974 | Paton et al. . |
| 3,914,573 | 10/1975 | Muehlberger ........................ 219/76.16 |
| 4,185,213 | 1/1980 | Scannell ................................ 310/11 |
| 4,495,399 | 1/1985 | Cann ................................ 219/121.59 |
| 5,328,516 | 7/1994 | Dietiker . |

FOREIGN PATENT DOCUMENTS

| | | |
|---|---|---|
| 1 181 788 | 8/1957 | France . |
| 685 455 | 12/1939 | Germany . |
| 1 075 765 | 2/1960 | Germany . |
| 30 14 258 | 10/1981 | Germany . |
| 42 35 766 | 5/1994 | Germany . |
| 43 25 939 | 10/1994 | Germany . |
| 95/07152 | 3/1995 | WIPO . |

OTHER PUBLICATIONS

Article: "Plasmatechnik" (Fig. 5.5;), A.Rutscher, 1984 (pp. 240–245).

*Primary Examiner*—Mark H. Paschall
*Attorney, Agent, or Firm*—Burns, Doane, Swecker & Mathis, L.L.P.

[57] ABSTRACT

A surface of a workpiece is treated by electric discharge. In particular, a concentrated plasma jet is generated through an arc discharge by a non-transferred electric arc while feeding—in a working gas. The surface of the workpiece to be treated is brushed over by the plasma jet.

9 Claims, 1 Drawing Sheet

METHODS AND APPARATUS FOR TREATING THE SURFACE OF A WORKPIECE BY PLASMA DISCHARGE

BACKGROUND OF THE INVENTION

The invention pertains to a process and apparatus for pre-treating the surfaces of workpieces by electric discharge.

Coating, painting or gluing of workpiece surfaces frequently requires pre-treatment of the same to remove impurities and thus change the molecule structure of the surface—particularly of workpieces made of plastics—so that the surface can be wetted with liquids such as glue, paint, etc.

A known process for pre-treating plastic foil consists of letting a corona discharge act on the foil surface. For this purpose the foil is moved through a small gap between the corona electrodes. This process, however, is only suitable for relatively thin foils. It may furthermore also result in an undesired pretreatment of the back of the foil, for example if an air bubble is located between the rear electrode and the foil and a further discharge takes place inside the air bubble.

A corona nozzle for the pre-treatment of the surface of thicker foils or solid workpieces is described in German Document 43 25 939-C1, with an oscillating or circulating air flow that exits between the electrodes that produces a vertically expanded discharge zone in which the workpiece surface to be treated can be brushed over by the corona discharge brushes. This corona nozzle, however, is not suitable for the pretreatment of workpieces with relatively deep reliefs, since interior corners, deep grooves, etc. cannot be reached at all, or only with difficulty, by the flat discharge zone of this nozzle. This known corona nozzle furthermore has a relatively complex and bulky design since a motor drive is required to produce the oscillating or circulating air flow.

The objective of the invention is to describe a process for pre-treating workpieces by electric discharge that can also be used for workpiece surfaces with a relatively complex relief, as well as an apparatus for carrying out this process.

SUMMARY OF THE INVENTION

This objective is met by the invention which relates to an electric discharge process for treating a surface of a workpiece. The process comprises the steps of generating, from a working gas, a plasma discharge which forms a concentrated jet of a reactive medium, the medium being reactive with respect to the surface of the workpiece, and applying the jet across the surface of the workpiece.

The invention further relates to a jet generator for treating a surface of a workpiece. The jet generator comprises an electrically insulative nozzle pipe having an internal diameter forming a flow channel for working gas. A pin electrode is disposed within the nozzle pipe adjacent a rear end of the flow channel. A ring electrode extends across a forward end of the flow channel and forms a nozzle opening arranged coaxially with the pin electrode. The nozzle opening is spaced forwardly from a tip of the pin electrode by a distance which is at least two times the internal diameter of the nozzle pipe. The flow channel is communicable with a source of working gas which flows through the nozzle pipe and the nozzle opening from an inlet located adjacent the rear of the flow channel, to generate a plasma discharge which forms a concentrated jet of a reactive medium extending from the nozzle opening.

A plurality of independently energizable pin electrodes may be provided to form a selected number of jets.

Thus, according to the invention, a concentrated jet of a reactive medium is generated by means of a plasma discharge while feeding in a working gas, and the surface to be treated is exposed to this jet.

This process is suitable for the treatment of both conductive and non-conductive workpieces, particularly for the treatment of workpieces made of plastic. Furthermore, it has been shown that a jet can be generated in the above fashion that is sufficiently chemically active to attain an effective surface pre-treatment, while having a temperature that is low enough to avoid harming even sensitive surfaces.

A further advantage of the process consists of the fact that a virtually ozone-free pre-treatment can be performed and that the undesired pretreatment of the back side of the workpiece can effectively be prevented. The undesired electrification of the surface of non-conductive workpieces is prevented as well.

A generator for producing the jet is formed by a pipe-shaped nozzle of electrically insulating material through which the working gas flows. The opening of the nozzle is surrounded by a ring electrode, and a pin electrode is installed inside the nozzle, the tip of which is axially recessed from the opening of the nozzle. The plasma arc thus essentially extends from the end of the tip of the pin electrode in an axial direction of the nozzle pipe, i.e., parallel to the flow of the working gas, to the ring electrode. This permits the generation of an intense, pointed and relatively sharply concentrated jet in front of the nozzle opening for an effective and even pre-treatment, even of hard-to-reach work-piece surfaces. The concentration of the jet may be adjusted as required by appropriately adjusting the distance between the tip of the pin electrode and the opening of the nozzle pipe.

The nozzle pipe preferably consists of ceramics and has an electrically conductive jacket around its outer circumference that is electrically connected to the ring electrode or manufactured in one piece with the same and extends approximately to the tip of the pin electrode at its opposite end. With this design, a relatively low voltage is sufficient to generate a corona discharge through the ceramic material to strike the arc discharge. To turn on the jet, it is thus only necessary to adjust the operating voltage upward, and no significantly increased ignition voltage is required.

The working gas—for example air or argon—is fed into the nozzle pipe, preferably near the vicinity of the pin electrode, in a manner so that it spins as it flows through the nozzle pipe. A uniform vortex then forms inside the nozzle pipe, whereby the arc is channeled inside the core of this vortex. Even if the pin electrode is not aligned precisely in a coaxial direction inside the nozzle pipe, a very stable arc results that extends as a single, sharply delimited branch along the axis of the nozzle pipe from the tip of the pin electrode approximately to the opening of the nozzle pipe before it splits into several branches radially extending to the ring electrode. The point at which the arc splits into its branches forms an almost point-shaped source for the reactive jet. In this design, the focus and divergence of the jet may also be influenced by varying the flow rate of the working gas without having to change the geometric configuration of the generator.

If a working gas with appropriate additives is used, the generator may also be used for the "plasma coating" of surfaces.

A preferred high-frequency alternating voltage in the range of 10 to 30 kV, with an optional small superimposed direct voltage component to stabilize the discharge, is applied to the electrode. An easily adjustable HF generator suitable to produce this alternating voltage is described in German Document 42 35 766-C1. The ring electrode is preferably grounded to prevent accidents or damage to electrically conductive workpieces caused by undesired discharges.

Since the jacket is grounded as well, the apparatus is shielded against exterior interferences and has a high electromagnetic compatibility (EMC).

According to an advantageous improvement of the invention, several jet generators are integrated into a common discharge head in one row, or offset in several rows, so that workpieces with large surface areas can be evenly pre-treated in an economical fashion. The ring electrodes in this design are formed by an electrically conductive block for all generators into which the individual nozzle pipes are embedded. The individual generators may be placed so close together that the cross sections of the individual plasma jets overlap at the level of the workpiece surface to be treated in a direction perpendicular to the relative movement of the discharge head and workpiece.

BRIEF DESCRIPTION OF THE DRAWING

Preferred designs are explained in detail in the following, based on the drawing.

The figures show as follows.

DETAILED DESCRIPTION OF PREFERRED EMBODIMENTS OF THE INVENTION

Figure 1:
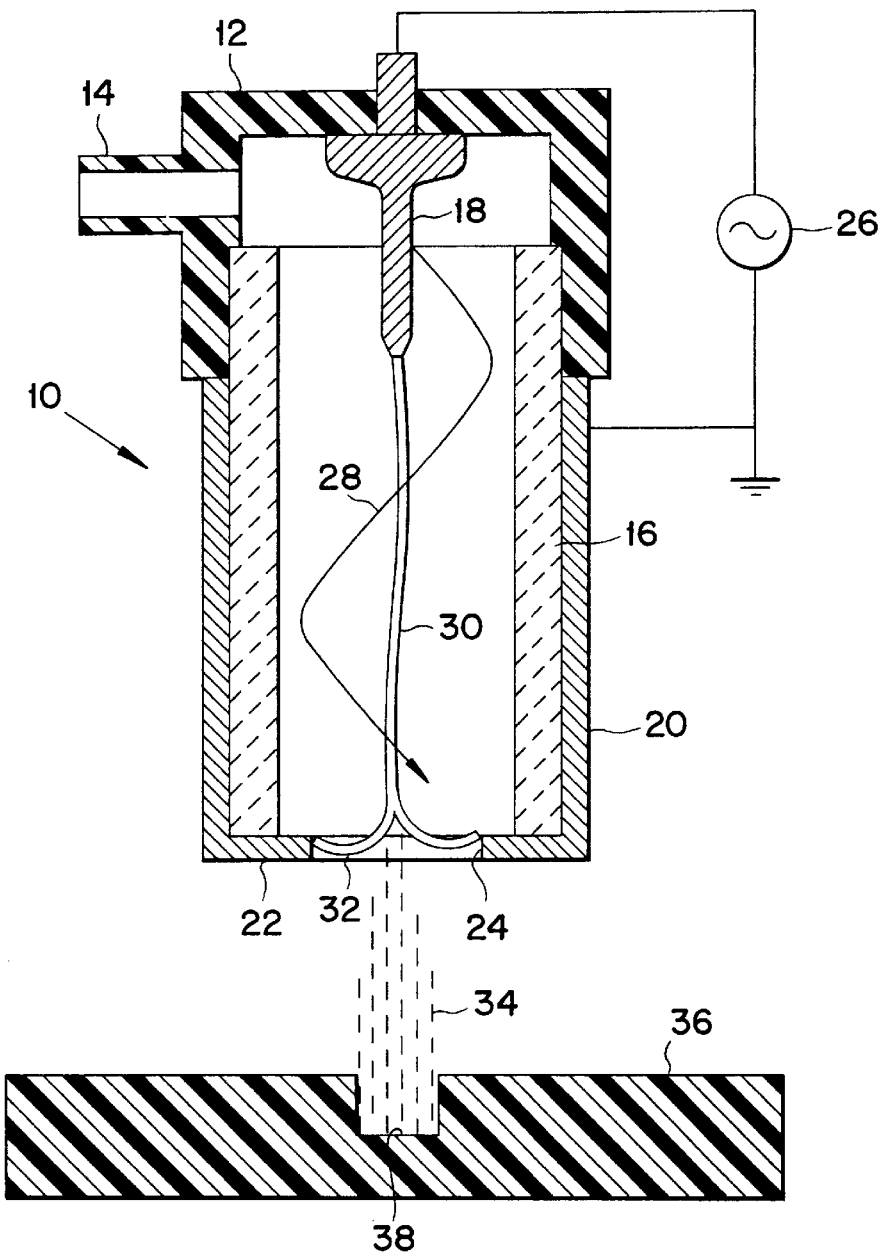
FIG. 1 a schematic, longitudinal section through a jet generator according to the invention.

The jet generator 10 shown in FIG. 1 has a pot-shaped housing 12 made of plastic with a lateral connection 14 to the supply line for a working gas. A nozzle pipe 16 formed of ceramics is held inside the opening of the housing 12 in a coaxial position. A pin electrode 18 formed of copper is centered inside the housing 12, the tip of which extends into the nozzle pipe 16. Outside the housing 12, the outer circumference of the nozzle pipe is covered by a jacket 20 formed of electrically conductive material forming a ring electrode 22 at the unattached front or lower end of the nozzle pipe 16. The ring electrode 22 delimits the nozzle opening 24, the diameter of which is somewhat smaller than the interior diameter of the nozzle pipe 16 so that the outlet of the nozzle pipe is contracted to a certain extent.

The jacket 20 and therefore also the ring electrode 22 are grounded, and an alternating current with a frequency in the range of 20 kHz, the voltage of which can be adjusted and is approximately in the range of 5 to 30 kV during the operation of the jet generator, is applied between this ring electrode and the pin electrode 18 by a high frequency generator 26.

The connection 14 for the working gas is installed eccentrically in relation to the housing 12 (i.e., a center axis of the connection does not intersect a center axis of the nozzle pipe 16) so that the supplied working gas spins helically as it flows through the nozzle pipe 16, as indicated by the helical arrow 28 in FIG. 1. Supported by the contraction at the outlet of the nozzle pipe, a stable gas vortex is generated, the core of which extends along the axis of the nozzle pipe.

The electrically conductive jacket 20 extends along the rear or upper end at which the housing is mounted, approximately to the tip of the pin electrode 18. When the voltage is adjusted upward, an initial Corona discharge takes place at the tip of the pin electrode 18. The discharge brushes, which have a bluish glow, extend radially to the wall of the nozzle pipe 16, and the charge carriers are transported to the jacket 20 through the ceramic material of the nozzle pipe 16. This corona discharge provides the necessary ions to strike an arc discharge from the pin electrode 18 to the ring electrode 22 when the voltage is increased. When air is used as the working gas, a white-blue glowing arc 30 results that extends from the tip of the pin electrode 18 in a sharply delimited, thin channel or beam along the axis of the nozzle pipe 16, approximately to the center of the outlet 24. Only there does the arc split into several branches 32 extending radially to the ring electrode 22. The point at which the axial arc 30 splits into its individual branches 32 also forms the source of a "flame" that has a slightly gold-colored glow when air is used as the working gas and, for the time being, is denoted as plasma jet 34.

This plasma jet 34 is used for the pre-treatment of surfaces. In the shown example, the plasma jet is used to pre-treat the surface of a workpiece 36, made of plastic, in the range of a groove 38. It is apparent that the plasma jet 34 enters into the groove so that the usually hard-to-reach bottom of the groove can be effectively pre-treated.

Whether this "flame" referred to here as plasma jet 34, really is a plasma in the true sense, i.e., an at least partially ionized medium, is not completely clear. Attempts were made to prove the electrical conductivity of this medium by holding the ends of two conductors into the flame, with one conductor directly connected to a battery and the other conductor connected to the battery through a light bulb. The light bulb only lit up, however, when one of the branches 32 of the arc sparked over to the conductor ends and connected the same. The conductivity of the plasma jet 34 is thus considerably lower than that of the plasma within the arc. It is possible that the "flame" consists of only slightly ionized plasma or a medium that merely contains free radicals or excited atoms or molecules. It has been proven without a doubt, however, that the plasma jet 34 has the desired pre-treatment effect on the surface of the workpiece placed under the jet. Several plastic surfaces that are not normally wettable with water were placed under the plasma jet 34 and subsequently coated with water. The surface areas treated with the plasma jet 34 could then be wetted with water. This effect is also apparent with strongly fluorinated polymers, such as PTFE.

It was also possible to effectively treat metal surfaces with the help of the plasma jet 34 and remove, for example, silicone oil residues, etc. Experiments with non-precious metals furthermore revealed that the plasma jet 34 has virtually no oxidizing effect. Even the treatment of aluminum did not produce any oxide layer.

The temperature of the plasma jet 34 is relatively low. Similar to a candle flame, it is possible to move one's finger through the plasma jet at a moderate speed without sustaining any burns.

In the design examples examined so far, the nozzle pipe 16 has an interior diameter of approximately 8 mm, and the axial distance between the tip of the pin electrode 18 and the nozzle opening 24 is approximately 55 mm. The interior diameter of the nozzle opening 24 is approximately 5 mm. Under these conditions, a plasma jet 34 is obtained having a length of approximately 30 mm and a maximum diameter of approximately 5 mm. The concentration, and thus also the reach, of the plasma jet may be improved by increasing the distance between the pin electrode and the nozzle opening 24. The contraction at the nozzle opening 24 also appears to have a positive effect on the concentration of the plasma jet.

When the flow rate of the working gas through the nozzle pipe 16 is increased, the source of the plasma jet moves further out, i.e., in the direction of the workpiece, and the flame becomes longer and thinner. At the same time, the outward curvature shown in FIG. 1 of the radial branches 32 of the arc increases. When the flow of the working gas is decreased or shut off completely, on the other hand, the axial arc 30 extends until it eventually fills newly the entire interior of the nozzle pipe. The plasma jet 34 becomes shorter and its source is no longer point-shaped but flatly distributed across the cross section of the nozzle opening 24. At a moderate gas flow it is noticeable that the arc 30 follows the spinning gas flow inside the nozzle pipe. When the flow rate of the gas is gradually increased, the arc 30 is increasingly compressed in a radial direction and fixed to the axis of the nozzle pipe. It thus appears that the arc 30 is channeled through the core of the gas vortex. Because of this effect, a very stable plasma jet 34 is obtained that originates from a point-shaped source immediately in front of the center of the outlet 24, if the gas flow is maintained at a sufficiently high level. The location and size of the surface area to be treated, as well as the intensity of the plasma treatment can be controlled precisely by adjusting the position of the workpiece 35 in relation to the jet generator 10 as required.

Because of the relatively large length of the plasma jet 34, the distance between the workpiece and the outlet 24 of the plasma burner can be adjusted large enough to prevent any damage to the surface due to a direct action of the branches 32 of the arc on the surface. Similarly, a transfer of the arc onto electrically conductive workpieces is also prevented.

Figure 2:
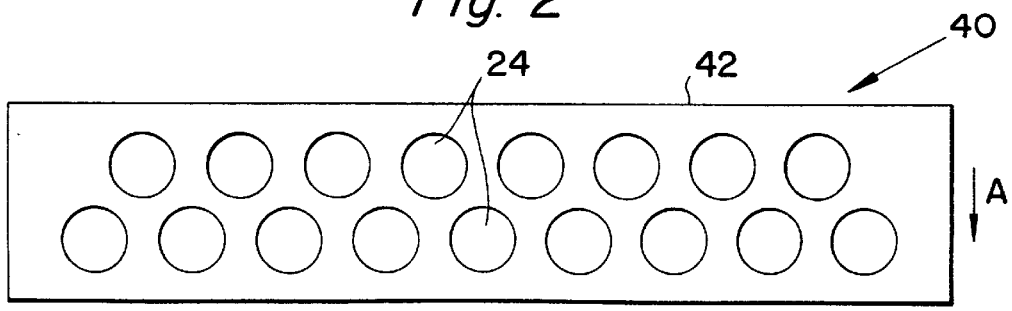
FIG. 2 a frontal view of a discharge head with several jet generators.

As can be seen from FIG. 1, the total radial dimensions of the jet generator 10 are relatively small, so that several similar jet generators can be tightly packed into one discharge head suitable for the treatment of larger workpiece surfaces. An example for such a discharge, head 40 is shown in FIG. 2. In place of the jacket 20 in FIG. 1, a one-piece metal block 42 was used in this design, inside which the nozzle openings 24 of the individual jet generators have been left open and which also forms the respective ring electrodes. The nozzle pipes 16 shown in FIG. 1—not visible in FIG. 2—are embedded in the metal block.

In the example shown, the nozzle openings 24 are arranged in two parallel rows in offset positions and overlapping each other. When the discharge head 40 is moved in the direction of the arrow A in FIG. 2 along the surface of a workpiece to be treated, the workpiece surface can thus be pre-treated with a virtually even "plasma curtain", the width of which can be adjusted as required by turning additional jet generators on or off.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A jet generator for treating a surface of a workpiece, comprising:

an electrically insulative nozzle pipe having an internal diameter forming a flow channel for working gas, the flow channel having a center axis;

a pin electrode disposed within the nozzle pipe adjacent a rear end of the flow channel; and a ring electrode extending across a froward end of the flow channel and forming a nozzle opening arranged substantially coaxially with the pin electrode, the nozzle opening being spaced forwardly from a tip of the pin electrode by a distance which is at least two times the internal diameter of the nozzle pipe, the pin electrode and the ring electrode arranged to form an arc within the flow channel;

the flow channel being communicable with a source of working gas and configured to cause the gas to flow in a vortex-shaped path through the nozzle pipe and the nozzle opening from an inlet located adjacent the rear of the flow channel, to constrain the arc to extend along the center axis while passing through the nozzle pipe, the arc generating from the working gas a plasma discharge which forms a concentrated jet of a reactive medium extending from the nozzle opening.

2. The jet generator according to claim 1 wherein the nozzle pipe comprises a ceramic material.

3. The jet generator according to claim 1 further including an electrically conductive jacket surrounding an exterior surface of the nozzle pipe, a front end of the jacket being electrically coupled to the ring electrode, and a rear end of the jacket extending substantially as far as the tip of the pin electrode.

4. An apparatus for treating a surface of a workpiece, comprising:

a plurality of electrically insulative nozzle pipes each having an internal diameter forming a flow channel for working gas, the flow channels arranged parallel to one another and defining respective parallel center axes;

a plurality of pin electrodes disposed within respective nozzle pipes adjacent a rear end of the respective flow channel;

a metal discharge head extending across a forward end of all of the flow channels and forming a plurality of coplanar electrically conductive nozzle openings arranged substantially coaxially with respective pin electrodes, each nozzle opening being spaced forwardly from a tip of the respective pin electrode by a distance which is at least two times the internal diameter of the respective nozzle pipe, each pin electrode and associated nozzle opening arranged to form an arc within the respective flow channel;

each flow channel being communicable with a source of working gas and configured to cause the gas to flow in a vortex-shaped path through the respective nozzle pipe and nozzle opening from an inlet located adjacent the rear of the flow channel, to constrain the arc to extend along the center axis while passing through the nozzle pipe, the arc generating from the working gas a plasma discharge which forms a concentrated jet of a reactive medium extending from the respective nozzle opening.

5. The jet generator according to claim 4 wherein the discharge head includes a portion surrounding an exterior surface of each of the nozzle pipes and extending rearwardly substantially as far as the tips of the pin electrodes, the tips being disposed in a common plane.

6. The jet generator according to claim 4 wherein the pin electrodes are independently energizable to form a selected number of jets.

7. An electric discharge process for treating a surface of a workpiece, comprising the steps of:

A) arranging, adjacent the surface to be treated, a generator including a nozzle pipe forming a flow channel extending from adjacent a rear end of the generator to adjacent a front end thereof and defining a center axis, a gas inlet disposed adjacent the rear end, and a gas outlet disposed adjacent the front end and intersected by the center axis, the outlet directed toward the surface to be treated;

B) introducing a working gas into the gas inlet and conducting the working gas along the flow channel toward the outlet such that the working gas forms a vortex traveling around the center axis;

C) striking an arc within the flow channel from adjacent the rear end to adjacent the front end, with the gas flow in the vortex being sufficiently strong to constrain the arc to travel along the center axis while passing through the nozzle pipe, the arc generating from the working gas a plasma discharge forming a concentrated jet of reactive medium which is reactive with respect to the surface to be treated; and D) applying the jet across the surface to be treated.

8. The process according to claim 7 wherein the flow channel is cylindrical, and during step C the arc extends along the center axis for a distance which is at least two times an internal diameter of the flow channel.

9. The process according to claim 7 wherein step B comprises conducting the working gas along a flow channel formed of electrically insulative material.

* * * * *